Jan. 11, 1938. I. M. TERWILLIGER 2,104,779
METHOD OF CINEMATOGRAPHY TO PRODUCE STEREOSCOPIC SOLID EFFECTS
Filed May 23, 1932 2 Sheets-Sheet 1

Inventor
Ivan Melville Terwilliger
By Lyon & Lyon
Attorneys

Jan. 11, 1938.  I. M. TERWILLIGER  2,104,779
METHOD OF CINEMATOGRAPHY TO PRODUCE STEREOSCOPIC SOLID EFFECTS
Filed May 23, 1932    2 Sheets-Sheet 2

Inventor
Ivan Melville Terwilliger
By Lyon & Lyon
Attorneys

Patented Jan. 11, 1938

2,104,779

UNITED STATES PATENT OFFICE 2,104,779

METHOD OF CINEMATOGRAPHY TO PRODUCE STEREOSCOPIC SOLID EFFECTS

Ivan Melville Terwilliger, Altadena, Calif.

Application May 23, 1932, Serial No. 612,897

6 Claims. (Cl. 88—16.6)

My invention relates to a method of photography whereby a plurality of successive images may be produced upon a film strip, in such manner that upon successive exhibition of the images, as in motion picture projection, a stereoscopic effect, or third dimension effect, is readily obtained without distortion of the images and without producing eyestrain to persons viewing the same.

In my copending application, Serial No. 492,713, filed November 1, 1930, I disclosed a method of photographing successive images upon a film strip, certain of the images being photographed while the camera was in one position relative to the object, while others of the images were produced when the camera was in a different position along the same optical axis as that along which the first mentioned images were produced. Such method of photographing the object produces successive images in which in certain of the images the foreground objects and a portion of the background objects are reproduced, while in other images the foreground objects and other portions of the background objects are reproduced so that upon exhibition or projection of the images successive pictures will show different portions of the background, thus achieving the effect of seeing around the foreground objects to create a stereoscopic effect.

However, while such method will produce a satisfactory stereoscopic condition, the fact that successive images are taken with the camera at different distances from the foreground objects makes the size and position of the image of the foreground objects differ on successive exposures so that upon exhibition, the image of the foreground objects is first one size and then another size, thereby producing a somewhat blurred reproduction of the foreground object.

It is, therefore, an object of the present invention to provide a method of stereoscopic photography in which the relative sizes of the images remain substantially the same, independent of variation in the distances of the camera from the objects in producing successive images.

Another object of the invention is to provide a method of stereoscopic photography in which successive images are produced by photographing foreground and background objects from a number of different positions along a single optical axis and in which the size of the image of foreground objects is compensated to produce successive images, in all of which the images of the foreground objects remain substantially the same size.

Another object of the invention is to provide a method of stereoscopic photography in which a single continuous film bears a series of successive images, certain of which are produced when the camera is at one distance from the object photographed, while others of which are produced when the camera is at a different distance from the object, and in which the variation in size of the images of any given object produced at the different distances is compensated for to produce a film in which all of the images are in substantially the same positions on the film, and are substantially the same size.

Other objects and advantages will be apparent from a study of the accompanying drawings, read in connection with the following specifications, in which Figure 1 is a diagrammatic view, illustrating an arrangement of camera and film employed in the practice of my invention;

In producing an ordinary motion picture film, it is the practice to photograph an object to form upon the film a series of successive photographic images, the successive images being produced while the camera or camera lens is stationary with respect to the object or scene photographed.

It is well-known that a person viewing an object or number of objects, receives not only the impression of the forward surfaces of the object, but also receives the impression of a third dimension or depth of the object primarily by reason of the fact that the double optical system constituted by human eyes views the same object from two separated points so that one of the eyes sees the object and also sees certain portions of the background beyond the object, while the opposite eye sees the same foreground objects, but sees other portions of the background. Hence, it is largely due to the impression received of two distinct portions of the background relative to a foreground object which creates the impression of depth or thickness of the foreground objects.

A number of attempts have been made to reproduce this depth effect in photography, such as by photographing an object from two distinct points along a plane at right angles to the optical axis of the lens, so as to produce two images which have been taken from points separated from each other substantially in the same magnitude as the human eyes are separated.

Figure 5:
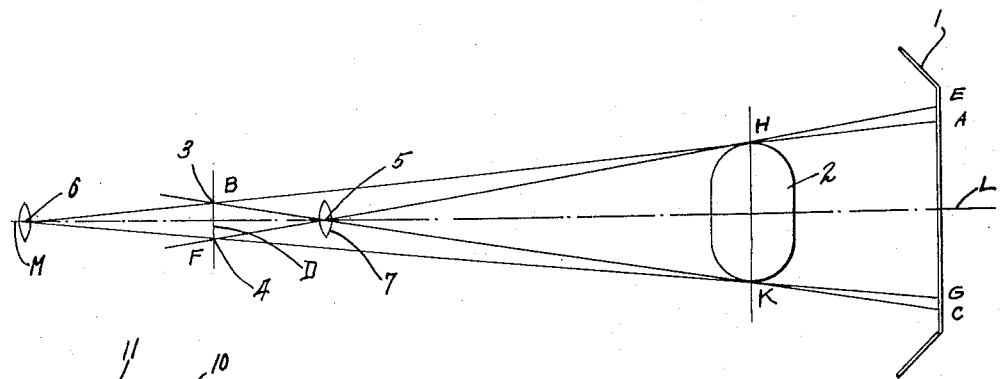
Figure 5 is a diagrammatic view, showing the optical effects produced in the practice of my invention.

By referring particularly to Figure 5, it will be observed that I have there diagrammatically illustrated the effect of vision by two eyes, or by lenses which are separated from each other along a plane at right angles to the axis of a lens.

In Figure 5 I have illustrated a background member 1 and a foreground member 2, each constituting the objects to be photographed. At 3 and 4 I have illustrated two optical viewpoints which are separated from each other in suitable distances D; for example, two and one-half inches as would constitute the normal distance between eyes of the human optical system.

It will be observed from an inspection of this figure that at the optical point 3 a view of the background and foreground objects would include the triangle indicated by the lines A, B, C, while the view which would be presented at the optical point 4 would constitute the triangle indicated by the reference characters E, F and G. However, it will be observed that the images produced at the points 3 and 4 include an overlapping portion of the background indicated by the triangles EHA and GKC so that different portions of the background are viewed from two optical points 3 and 4, thus producing the effect of depth to the image of the foreground object and registering effectively the fact that the foreground object 2 is spaced a considerable distance in advance of the background object 1.

It will be observed that the lines EF and CB intersect each other at a point 5 and that likewise the lines AB and GF intersect each other at a point 6. It follows, therefore, that if instead of viewing the objects from points 3 and 4 the similar stereoscopic effect may be produced by viewing the objects from the points 5 and 6, since from these viewpoints substantially the same total overlapping of background portions viewed from the two points will occur as was viewed from the points 3 and 4. Hence if a photograph of the object is taken from the point 5, and another photograph of the object is taken from the point 6, the combined images so produced will be substantially identical with the images which would be viewed simultaneously from the points 3 and 4, or which would be viewed by the combined images taken separately at the points 3 and 4.

Thus if a camera were employed movable along the central axis L and M which intersects the points 5 and 6 with the lens 7 of the camera positioned at the points 5 and 6, successive images will be produced which, when combined, will produce the stereoscopic effect desired and the impression which will be created by reproducing the combined images produced at these two points (if sufficiently rapid to be within the normal retention of vision, as in the ordinary motion picture projection) the images so produced will be combined in the vision of a person viewing the same and will produce the effect of viewing an image having not only length and breadth, but also having solid thickness.

In my copending application, hereinbefore referred to, I disclosed a method of producing images from two points, such as 5 and 6 along the optical axis LM by moving the camera toward and away from the objects to be photographed and making successive images upon a film while the camera was in the desired positions relative to the objects.

It will be apparent, however, that in photographing objects which are relatively close to the camera, such as the foreground object 2, against a background which is at some distance from the foreground object 2, the successive images which are produced will show the foreground member registered upon the film in different dimensions, the images taken when the camera is in its forward position, (that is at the point 5) will show the foreground member as relatively large while the images taken from the other position will show the foreground object materially reduced in size.

Also, there is a considerable lateral distortion, particularly of objects in the foreground; that is, objects which are registered near the side edges of the film in the rearward position would not register at all in the forward position, or would register at such laterally displaced points as to prevent effective coordination of the images when reproduced. For example, referring particularly to Figure 6, it will be observed that I have illustrated a section of film 9 upon which is registered two successive images 10 and 10a of the same scene, the scene being a diagrammatic perspective of a series of posts 11. The upper frame 12, upon which one of the images—for example that registered from the position 6 in Figure 5—shows a number of the posts, one of which is near the right hand edge of the film strip 9, while another is also near the opposite side edge of the film strip. The successive frame 13 illustrates the same scene when photographed from the position indicated at 5 in Figure 5, that is, with the camera in a position closer to the foreground objects. In this frame it will be observed that the posts represented at the extreme edges of the film strip do not register completely thereon, one-half of each of these posts being registered upon the film.

Figure 6:
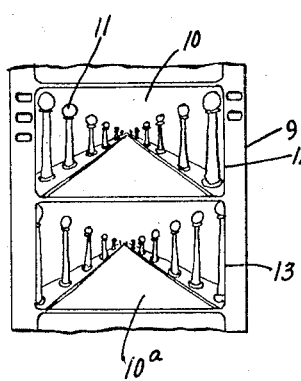
Figure 6 is a detail view of the images on a film strip produced in accordance with my invention.

It will also be observed from an inspection of Figure 6 that substantially no displacement has occurred between the positions of the posts in the background of the image, since they are a sufficient distance away from the lens of the camera that a change in position of the camera of several inches does not change the focal plane of objects in the distant background by a sufficient amount to cause any perceptible displacement.

If images of the character shown is Figure 6 are successively reproduced, as by projection upon the screen, the foreground objects would seem to shift their positions, thus rendering it difficult to obtain any distinctness of registration of the images, and causing the foreground images to register upon a person viewing the same as blurred.

If the change in position of the foreground objects upon the film can be compensated for to make all of the images substantially the same size and occupy substantially identical positions upon the film, the reproduction of pictures produced in this manner may be had in which substantially no blurring or distortion of the foreground images will occur. That is, if, as the camera is shifted toward and away from the foreground objects, the distance between the camera lens and the film is also altered, or the lens system altered to correspond to this movement, the foreground objects may be focused upon the films in such positions and in such sizes as will produce a substantially constant coordinated size and position obviating the undesirable distortion and yet accomplishing the result that the different portions of background images will be viewed and registered by the camera in the two successive positions with sufficient clearness and distinctness to produce the depth or stereoscopic solid effect desired.

Figure 1:
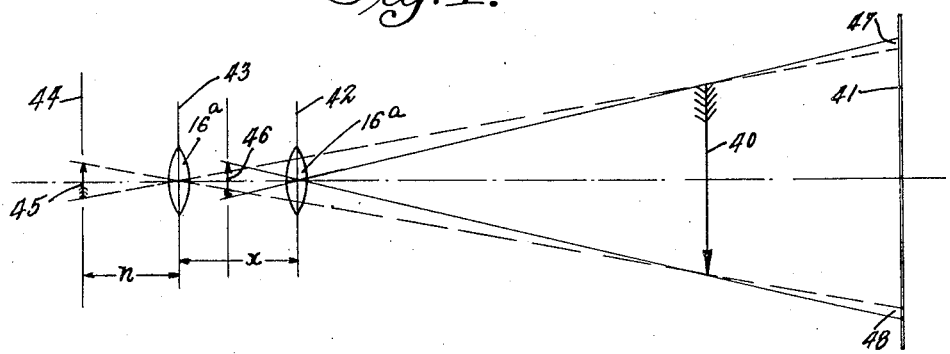
Figure 2:
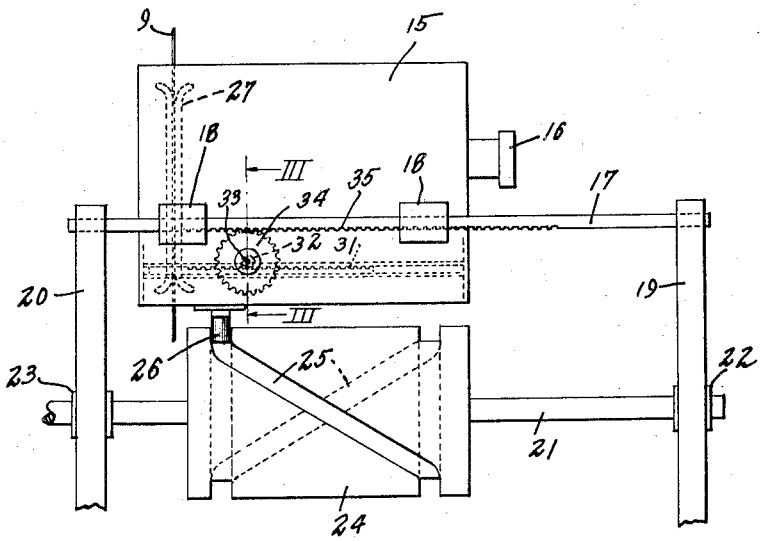
Figure 2 is an elevational view of a camera and operating mechanism therefor which may be employed in the practice of my invention.
Figure 3:
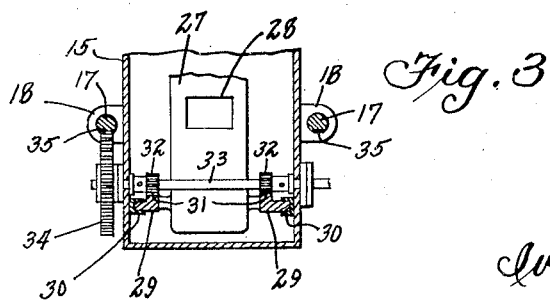
Figure 3 is a detail, sectional view, taken along line III—III of the camera shown in Figure 2.

By referring particularly to Figures 1, 2 and 3, it will be observed that I have illustrated a method of producing the desired result of photographing the image from two positions along the same optical axis and in which the image, position and size are so compensated that no distortion takes place.

By referring particularly to Figures 2 and 3, it will be observed that one embodiment of the invention may take the form of a camera 15 provided with a suitable lens 16, the camera being slidably mounted upon a suitable supporting structure comprising slide bars 17 indicated by sliding supports 18 which are secured rigidly to the camera. The slide bars 17 may be supported in suitable frames 19 and 20 at opposite ends thereof so that the camera 15 may readily move along the optical axis of the lens 16 toward and away from the objects to be photographed. If desired, the camera may be moved to its successive positions by means of a mechanical device, one form thereof being illustrated in Figure 2 as comprising a rotatable shaft 21 suitably journaled as at 22 and 23 in the end frames 19 and 20, respectively. The shaft 21 is illustrated as being provided with a cam cylinder 24 having an endless cam groove 25 in the surface thereof to engage a depending pin 26 rigidly secured to the camera 15. Hence rotation of the cam cylinder 24 will cause the pin 26 to be moved forwardly and rearwardly to move the camera to the positions corresponding to the contour of the cam groove 25.

Thus by constructing the length of the cam cylinder with the longitudinal distance to be traveled by the pin 26, substantially equal to the desired distance between the positions 5 and 6 at which the images are to be photographed, successive images of the objects will be produced, as is indicated in Figure 5.

In order to produce the compensation for image size and image displacement of the foreground objects, the film-holding structure 27 may be arranged to move toward and away from the lens 16 by a motion proportional to the distance through which the lens 16 is moved toward and away from the objects to be photographed. Such film supporting structure 27 is illustrated diagrammatically as a pair of plates between which the film strip 9 may pass, when driven by any suitable intermittent mechanism well-known in the art for feeding film in a camera past a suitable photographing aperture 28.

The film supporting structure may be mounted for movement toward and away from the lens 16 in any suitable manner, for example, as is illustrated in Figures 2 and 3 herein, the film supporting plates 27 may be secured to a pair of slides 29 operable longitudinally of the camera in slideways 30. I have also illustrated the slides 29 as having upon their upper surfaces a plurality of gear teeth 31 to form a gear rack engaging a small pinion 32 which is in turn secured to a shaft 33 extending from the interior of the camera 15 to the exterior thereof. On the outer end of the shaft 33 may be secured a larger gear 34 to engage a gear rack 35 secured to or a part of one of the rails 17 so that by properly selecting the ratio of gearing 34, 32 a given amount of movement of the lens 16 toward and away from the objects to be photographed will produce a proportional movement of the film toward and away from the lens 15. Thus a foreground object which would be reduced as of a certain size upon the film when the camera is in the forward position, will register as approximately the same size image when the camera is in the rearward position, thus insuring that the images produced in the several positions of the camera will coordinate with each other to avoid the blurring or distortion of the images when produced.

For example, by referring to Figure 1, it will be observed that a foreground object 40 to be photographed against a background 41 may be photographed from a forward position 42, and also from a rearward position 43, a representation of the lens 16 in each position being indicated by the reference character 16a. Assuming that the normal distance between the lens 16a and the film positioned along the line 44 is the distance indicated by the arrow $n$, the image produced in the rearward position will be that indicated at 45 having a given dimension. However, when the camera is moved toward the foreground object, the image produced would be larger, but if the forward movement of the camera by the amount indicated by the arrow $x$, representing the distance between the points 42 and 43 is also accompanied by a forward movement of the film relative to the camera, the object 40 may be photographed in the forward position with the image thereon substantially the same size as that indicated at 45. Thus if the film is moved toward the lens to a distance indicated by the arrow $n$, the image 46 will be substantially in exact size and position upon the film as was the image 45.

It will also be observed from an inspection of Figure 1 that the overlapping sections 47 and 48 of the background 41 will be registered correctly upon the film in the two positions of the camera, thus insuring that the stereoscopic effect will be produced.

It will thus be observed that a stereoscopic solid effect may be readily produced in a film of the motion picture type by producing in successive frames upon the film images photographed at different distances away from the objects, while substantially no displacement of the objects results.

While the shifting of both camera and film is illustrated, the same effect may be produced by providing a lens system with a variable focus and varying the same to produce an apparent change of exposure position rather than by actually moving the camera. Also the optical system may be so arranged as to enlarge or reduce the images without actually changing the position of the film as will be understood by those skilled in the art.

While the apparatus illustrated in Figures 2 and 3 contemplates the formation of alternate images upon the film from the two positions, such sequence is not essential, it being possible, and in instances, desirable, to produce in a number of successive frames, images which are taken from the same distance away from the object, while following these may be a succession of frames upon which the image registered from this point are a different distance away from the object. Thus desirable effects may be produced by permitting either the foreground objects to predominate over the background objects, or permitting the background objects to predominate over the foreground objects. For example, the foreground object may predominate by photographing objects from the forward position a greater number of times than from the rearward position. Thus the overlapping portions of the background, though shown a sufficient number of times to create the stereoscopic effect, may be weakened in its effect upon the observer so that the background objects stand out with unusual distinctness yet with all of the appearance of depth, rounded curves, and other desirable stereoscopic effects.

In some instances, it may occur that enlargement of the foreground image, or reduction of the size of the foreground image to a common coordinate size to secure the desired image size compensation, may cause such distortion of the background as to render the background very indistinct. This difficulty, however, is not fatal to my process, and, in fact, can be employed to produce novel desirable effects. For example, if the foreground object is very close to the camera, a sharp focus of the foreground object may be made in the forward position of the lens so that both the foreground objects and the background objects are substantially distinct upon the images formed with the lens in its forward position. However, when the lens is in its rearward position, the focus of the lens may be so arranged as to sharply focus upon the foreground image, but the background may be very indistinct. By properly coordinating the number of exposures in each of the two positions, and properly coordinating the sequence of exposures in the two positions, the indistict background will not appreciably register so that the finished film when viewed will show the background a sufficient number of times and register clearness therein, while the change of focus upon the foreground image will present a clear and distinct foreground image having the characteristics of the stereoscopic effect desired.

To further assist in the production of images with the background distinct and other images with the background indistinct, the iris of the camera may be actuated to increase or decrease the size of the sight opening, as will be understood by those skilled in the art. Such opening and closing of the iris may be coordinated in any suitable manner with the movement of the camera.

It may also be desirable to photograph the images upon a negative film without compensating for the size of the image in the different positions of the camera and to make such compensation later in the printing of a positive film from the negative.

Figure 4:
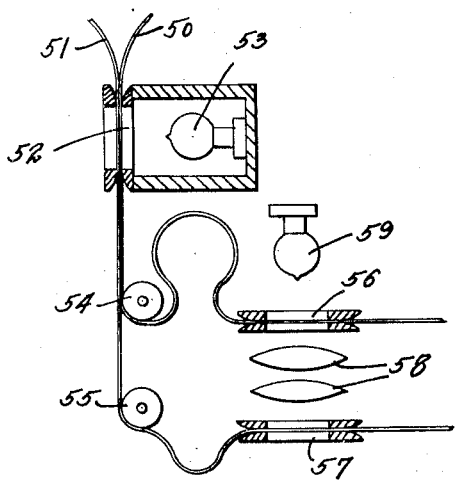
Figure 4 is a diagrammatic view of a modified form of apparatus, which may be employed to produce compensation of any size in accordance with my invention.

In Figure 4 I have illustrated diagrammatically a method of compensating for sizes of the foreground image in a printing machine by passing a negative film 50 and a positive film 51 past an aperture 52 and projecting a light from a lamp 53 thereon, at the time at which the negative film and the positive film are in contact, thus printing the image from the positive to the negative without enlargement.

I have illustrated the films 50 and 51 as extending past the aperture 52 over a pair of rollers 54 and 55, respectively, which causes a separation of the negative and positive films, the negative passing a second aperture 56 while the positive film is passing an additional aperture 57. The apertures 56 and 57 are illustrated as being spaced from each other and suitable enlarging lenses 58 are interposed therebetween to enlarge the image from the negative film to print a larger image on the positive film. By selecting the lens system properly, differing amounts of enlargement of the foreground image may be provided to insure printing the images taken with the camera in the rearward position in the desired coordinated size necessary to produce the stereoscopic effect without distortion of the size or placement of the various parts of the image upon the frame.

While I have shown and described no feeding mechanism, it will be understood that the films will be fed through the printing machine in such manner as to present a certain sequence of frames to contact printing by the lamp 53, while another sequence of frames will be presented to the apertures 56 and 57 for printing by an additional lamp 59. Thus, for example, the film may be fed to the frames one at a time past the aperture 52 so that every other frame will be printed by the lamp 53 and likewise alternate frames will be printed by the lamp 59, which condition will obtain when the sequence of images registered upon the negative film is that of a forward image, a rearward image, a forward image, etc. If the negative film has registered on it two successive frames taken in the forward position and one frame taken in the rearward position, the driving mechanism of the printing machine may be so coordinated as to first move the film past the aperture 52 so that two successive frames register thereon, while the third frame does not register with the aperture 52 but the other frame will register with the apertures 56 and 57. It will be understood by those skilled in the art that any desired driving mechanism may be arranged to print any desired sequence and order of images.

While I have shown and described the preferred embodiment of my invention, it is to be understood that I do not wish to be limited to any of the details of construction shown herein, except as described in the appended claims.

I claim:

1. The method of stereoscopic photography, which consists in photographing a series of images of foreground and background objects upon a single film strip with both foreground and background objects in focus, photographing a second series of images of the same objects on the same fixed optical axis at a distance from the objects differing by a foot or less from the first position, the second series of exposures being lesser in number than the number of exposures in the first series, with the foreground object in sharp focus, and the background out of focus, and reducing the images of the foreground object to a common coordinate size with the same images in the first series and intermingling the exposures of the first series and the second series.

2. The method of stereoscopic photography, which consists in photographing a succession of images of the same foreground and background objects along the same fixed optical axis upon a single film strip, with one series of successive images representing the aspect at one distance from the objects, the series containing a predetermined number of exposures with the background and foreground objects both in relatively sharp focus, and with the next successive images arranged in a series of a greater predetermined number of exposures representing the aspect from a different greater distance from the objects, and with the images of any selected object thereon enlarged to coordinate with the size of the images of that object in the first mentioned series and having one of the foreground images in the second series in sharp focus and alternating the exposures of one series with the exposures of the other series.

3. The method of stereoscopic photography, which consists in moving a camera toward and away from an object along the optical axis of the camera, photographing upon a single film strip a plurality of successive images of the object by exposing the film only when the camera is in its forward and in its rearward position relative to the object, and altering the position of the film relative to the lens of the camera to register the image of the object in the same sizes and same relative positions in each of the successive images so produced and reducing the light intensity at one exposure position and registering a dominant image at the other exposure position.

4. The method of stereoscopic photography, which consists in moving a camera toward and away from an object along the optical axis of the camera, photographing upon a single film strip a plurality of successive images of the object by exposing the film when the camera is in its forward and rearward position respectively relative to the object, to produce a negative film bearing a sequence of images intermingled and taken from different distances from the object, printing a positive film from the negative film, and during the printing operation enlarging the negative images taken from the more distant camera positions or reducing the images taken from the nearer camera position to print upon the positive film a combination of images taken from the two distances intermingled, and with one at least of the objects represented thereon in the same size and coordinated in matched position in all of the positive frames.

5. The method of stereoscopic photography which consists in photographing a series of images of foreground and background objects upon a single film strip, photographing a second series of images of the same objects from a distance of one foot or less nearer the objects along the same fixed optical axis, bringing one at least of the object images to an identical size in all frames, and fluctuating another one at least of the object images between different positions in the different series, intermingling one series with the other to cause on projection the foreground object images to stand out to a degree at least from the background, and making those object images which are constant in focus and position to predominate in sharpness and intensity over those object images which vary in focus and position.

6. The method of stereoscopic photography which consists in photographing a series of pictures of a scene, containing objects in separated foreground and background positions, upon a single film strip, reducing the distance between the camera and the scene, photographing a second series, at least, of pictures of the scene along the same fixed optical axis, maintaining one at least of the object images in a coordinated size in all the pictures, and fluctuating another one at least of the object images between different positions in the differing series, intermingling one series with another to cause on projection the images of foreground objects to stand out to a degree at least from the background, and making one series of pictures, corresponding to one distance from the scene, to predominate over the pictures corresponding to differing distance from the scene.

IVAN MELVILLE TERWILLIGER.